J. F. FERGUSON.
REFRIGERATOR.

No. 181,326.  Patented Aug. 22, 1876.

Witnesses:
P. C. Dieterich
F. H. Duffy

Inventor:
James F. Ferguson
Per: Charles E. Allen, Attorney.

UNITED STATES PATENT OFFICE.

JAMES F. FERGUSON, OF ESSEX, VERMONT.

IMPROVEMENT IN REFRIGERATORS.

Specification forming part of Letters Patent No. 181,326, dated August 22, 1876; application filed May 23, 1876.

*To all whom it may concern:*

Be it known that I, JAMES F. FERGUSON, of Essex, in the county of Chittenden and State of Vermont, have invented a new and useful Improvement in the Method of Keeping Milk, Cream, and Butter at any desired temperature at all seasons of the year.

My invention consists in the construction and arrangement of what may be called an "insulated milk-bureau," of which the following is a description, reference being had to the accompanying drawings and letters thereon, which form a part of this specification.

In the upper part of this bureau is placed a pan or reservoir for ice, and in the lower part one for hot water, for the purpose of cooling or heating the temperature of the interior of the bureau to any desired degree.

If preferred, hot free-stones or any other suitable heating apparatus may be used instead of hot water.

The contents of the bureau are protected from dust, insects, or dirt by doors in front, which may be hung so as to expose the whole interior at once, when a single door only is required; or, if greater protection is desired, one side of the bureau, or even each shelf, may be provided with separate doors. An ample supply of pure air is obtained through ventilators in its top and bottom.

The interior of the bureau is lighted through glazed openings, either in the sides or the doors, or both, according to the amount of light deemed necessary. On the inside of one of these a thermometer may be placed, so that the interior temperature may be conveniently observed without opening the doors.

The bureau stands upon casters, so that it is portable, and therefore readily moved to the most convenient location. In the construction or arrangement of these casters, glass, gutta-percha, porcelain, or any other electric substance is used, by means of which the bureau is insulated from its electrical connection with the room, thereby preserving its contents from souring or being otherwise unfavorably affected by the electricity in the atmosphere, especially during the prevalence of storms.

Figure 1:
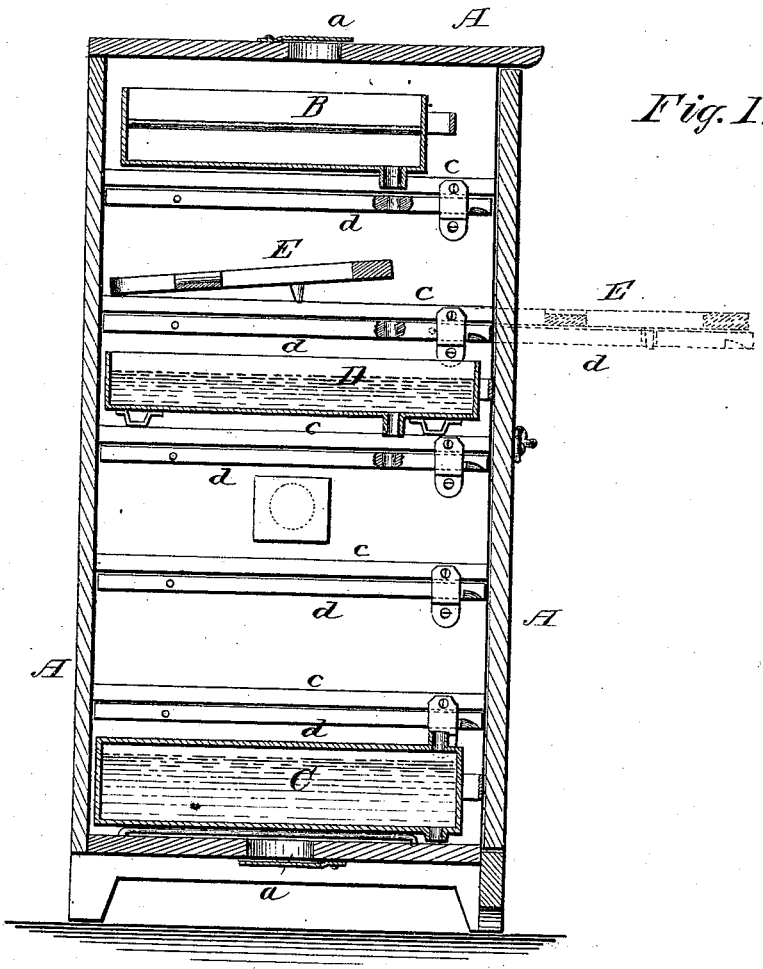
Figure 2:
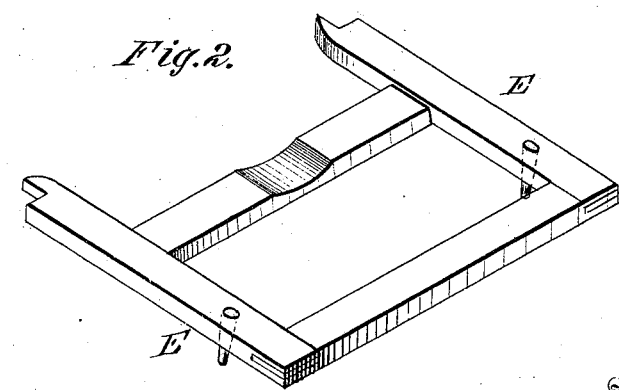

In the drawings, Figure 1 represents a vertical section of the bureau, containing any specified number of divisions. Fig. 2 is a perspective view of the frame resting upon the sliding supports, and upon which the pans are rolled, so that their contents may be more conveniently reached.

A is the bureau, on the inside of the sides of which cleats are arranged, upon which the ice pan or reservoir B above, and the milk-pans D below, are intended to rest. $d$ $d$ are supports, which are made to slide out from beneath the cleats, and upon which the movable frame E is placed to support these pans, whenever they are rolled out for greater convenience of access.

If preferred, this frame may be connected directly to the cleats $c$ $c$ by a movable attachment, instead of resting upon the slides $d$ $d$.

Both the ice pan or reservoir and the milk-pans are preferably made in a rectangular form, the corners being rounded for greater convenience in cleaning. They are provided with casters, so that they may be more easily moved.

In the lower division of the bureau is placed the heating apparatus. When not otherwise required, this division can be appropriated to jars of cream or butter.

By filling the reservoir B with ice and closing the doors of the bureau, the temperature of its contents is soon reduced by the continuous current of air, which, having become chilled in its contact with the ice, descends, and thus establishes a circulation throughout the interior. The extent as well as the purity of this current of air is regulated by the ventilators $a$ $a$.

When it is desired to raise the temperature of the interior, a similar circulation is produced with hot air generated by heated free-stones, hot water, or otherwise, in the division C, at the bottom of the bureau.

What I claim, and desire to secure by Letters Patent, is—

1. A milk-safe, A, provided with an upper cooling-reservoir, B, a lower heating-reservoir, C, and the intermediate milk-pans D, resting upon suitable cleats $d$, arranged as described, and for the purpose set forth.

2. In the milk-case A, provided with upper cooling and lower heating reservoirs, the pans D, arranged above each other, and adapted to be drawn out upon suitable sliding frames E, all arranged as and for the purpose described.

JAMES F. FERGUSON.

Witnesses:
M. S. WOODMAN,
H. D. BROWN.